(12) United States Patent
Fujiwara et al.

(10) Patent No.: US 6,316,915 B1
(45) Date of Patent: Nov. 13, 2001

(54) CHARGE/DISCHARGE PROTECTION CIRCUIT AND BATTERY PACK HAVING THE CHARGE/DISCHARGE PROTECTION CIRCUIT

(75) Inventors: Akihiko Fujiwara, Tokyo; Hideyuki Aota, Hyogo, both of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/702,651

(22) Filed: Nov. 1, 2000

(30) Foreign Application Priority Data

Nov. 2, 1999 (JP) .................................................. 11-312713

(51) Int. Cl.[7] ...................................................... H02J 7/00
(52) U.S. Cl. ................................................................ 320/134
(58) Field of Search ..................................... 320/134, 136

(56) References Cited

U.S. PATENT DOCUMENTS

| | | | |
|---|---|---|---|
| 5,493,197 | * 2/1996 | Eguchi et al. | 320/134 |
| 5,936,384 | 8/1999 | Fukiwara et al. | |
| 5,990,663 | * 11/1999 | Mukainakano | 320/134 |
| 6,114,831 | * 9/1999 | Attimont et al. | 320/106 |
| 6,118,253 | * 5/1999 | Mukainakano | 320/134 |

FOREIGN PATENT DOCUMENTS

| | | |
|---|---|---|
| 6-104015 | 4/1994 | (JP) . |
| 10-4637 | 1/1998 | (JP) . |
| 11-103528 | 4/1999 | (JP) . |

* cited by examiner

Primary Examiner—Peter S. Wong
Assistant Examiner—Pia Tibbits
(74) Attorney, Agent, or Firm—Dickstein Shapiro Morin & Oshinsky LLP

(57) ABSTRACT

A charge/discharge protection circuit of the present invention includes a first terminal to which a negative electrode of a charger is connected and an internal detector unit which has an input connected to the first terminal, and prevents the variation of the threshold voltage of the input transistors in a short-circuit detector unit and in an overcurrent detector unit when the improper charger is connected to the battery for a long time. An improper charger detector unit outputs a detection signal when an improper charger is connected to the battery pack, in response to a voltage supplied to the first terminal by the improper charger. A connection cutoff unit cuts off, when the detection signal is output by the improper charger detector unit, the connection between the internal detector unit input and the first terminal, so that, when the improper charger is connected to the battery pack, a voltage of the input of the internal detector unit is avoided from being lower than a voltage of a second terminal to which a negative electrode of the battery is connected.

10 Claims, 6 Drawing Sheets

PRIOR ART

CHARGE/DISCHARGE PROTECTION CIRCUIT AND BATTERY PACK HAVING THE CHARGE/DISCHARGE PROTECTION CIRCUIT

BACKGROUND OF THE INVENTION

1. Field of the Invention

The present invention relates to a charge/discharge protection circuit provided in a battery pack that supplies power to mobile electronic equipment, the charge/discharge protection circuit protecting a rechargeable battery of the battery pack from being damaged when the battery is placed in an overcharge condition, an overdischarge condition or an overcurrent condition. Further, the present invention relates to a battery pack in which the battery and the charge/discharge protection circuit are provided.

2. Description of the Related Art

In recent years, the proliferation of mobile electronic equipment in the art is remarkable. In the mobile electronic equipment, a battery pack containing a secondary or rechargeable battery is commonly used as a power supply that supplies power to the mobile electronic equipment. When the voltage supplied to the mobile electronic equipment by the battery pack is excessively decreased after the use over an extended period of time, the battery in the battery pack is recharged with a charger, and the battery pack can be repeatedly used again as the power supply for the mobile electronic equipment.

As disclosed in Japanese Laid-Open Patent Application No.11-103528, a charge/discharge protection circuit for protecting a battery of a battery pack against damage is known. In the charge/discharge protection circuit disclosed in the above document, the circuit elements to which only the battery voltage is supplied are constructed in a low-voltage resistant structure, and the circuit elements (or part of the integrated circuit semiconductor device) to which the charger voltage is supplied are constructed in a high-voltage resistant structure.

In the above charge/discharge protection circuit, the high-voltage resistant structure is needed only for the specific circuit elements. The above charge/discharge protection circuit can avoid the damage of the battery when it is placed in an undesired condition, and it is useful to downsize the integrated circuit chip for mounting the charge/discharge protection circuit.

However, in the above charge/discharge protection circuit, some circuit elements for detection of undesired conditions of the battery are connected at their inputs directly to the terminal to which the charger voltage is supplied.

When an improper charger, which supplies an excessively large voltage, is connected to the battery pack, the large voltage from the improper charger will be supplied to the above charge/discharge protection circuit. The above charge/discharge protection circuit detects that an overcharge condition of the battery occurs, and cuts off the connection between the improper charger and the battery. At this time, the potential of the terminal connected to the minus electrode of the improper charger is lower than the potential of the terminal connected to the minus electrode of the battery. The voltage at the inputs of the circuit elements of concern in the above charge/discharge protection circuit is lower than the potential of the terminal connected to the minus electrode of the battery. If this condition is kept on for a long time, the threshold voltage of the circuit elements used for the detection of the undesired conditions of the battery will be significantly varied. As a result, the characteristics of the circuit elements used for the detection of the undesired conditions of the battery will be significantly varied.

Since the above charge/discharge protection circuit is configured such that some circuit elements are constructed in the high-voltage resistant structure and the others are constructed in the low-voltage resistant structure, the variation of the threshold voltage of the circuit elements is more considerable than in a charge/discharge protection circuit configured with all the circuit elements built in the same structure.

SUMMARY OF THE INVENTION

Accordingly, it is a general object of the present invention to provide an improved charge/discharge protection circuit in which the above-described problems are eliminated.

Another object of the present invention is to provide a charge/discharge protection circuit that is small in size and high-voltage resistant, and effectively prevents the variation of the threshold voltage of the circuit elements for detection of the undesired conditions of the battery even when an improper charger is connected to the battery pack over an extended period of time.

Another object of the present invention is to provide a battery pack in which a rechargeable battery and a charge/discharge protection circuit are provided, the charge/discharge protection circuit being small in size and high-voltage resistant, and effectively preventing the variation of the threshold voltage of the circuit elements for detection of the undesired conditions of the battery when an improper charger is connected to the battery pack over an extended period of time.

The above-mentioned objects of the present invention are achieved by a charge/discharge protection circuit for protecting a rechargeable battery of a battery pack from damage, which includes: a first terminal to which a negative electrode of a charger is connected; an internal detector unit which has an input connected to the first terminal; an improper charger detector unit which outputs a detection signal when an improper charger is connected to the battery pack, in response to a voltage supplied to the first terminal by the improper charger; and a connection cutoff unit which cuts off, when the detection signal is output by the improper charger detector unit, the connection between the internal detector unit input and the first terminal, so that, when the improper charger is connected to the battery pack, a voltage of the input of the internal detector unit is avoided from being lower than a voltage of a second terminal to which a negative electrode of the battery is connected.

The above-mentioned objects of the present invention are achieved by a battery pack which includes a rechargeable battery and a charge/discharge protection circuit, the charge/discharge protection circuit including: a first terminal to which a negative electrode of a charger is connected; an internal detector unit which has an input connected to the first terminal; an improper charger detector unit which outputs a detection signal when an improper charger is connected to the battery pack, in response to a voltage supplied to the first terminal by the improper charger; and a connection cutoff unit which cuts off, when the detection signal is output by the improper charger detector unit, the connection between the internal detector unit input and the first terminal, so that, when the improper charger is connected to the battery pack, a voltage of the input of the internal detector unit is avoided from being lower than a voltage of a second terminal to which a negative electrode of the battery is connected.

In the charge/discharge protection circuit of the present invention, when the detection signal is output by the improper charger detector unit, the connection cutoff unit cuts off the connection between the internal detector unit input and the first terminal, so that, when the improper charger is connected to the battery pack, a voltage of the input of the internal detector unit is avoided from being lower than a voltage of a second terminal to which a negative electrode of the battery is connected. The charge/discharge protection circuit of the present invention is effective in preventing the threshold voltage of the input transistors in the internal detector unit from being significantly varied when an improper charger is connected to the battery pack. Further, the charge/discharge protection circuit of the present invention is effective in avoiding the damage of the battery when it is placed in the undesired condition, and in downsizing the integrated circuit chip for mounting the charge/discharge protection circuit.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENT

Before describing the preferred embodiment of the present invention, a description will now be provided of a charge/discharge protection circuit for a battery pack with reference to FIG. 3 through FIG. 7, in order to facilitate understanding of the concepts of the present invention.

Figure 3:
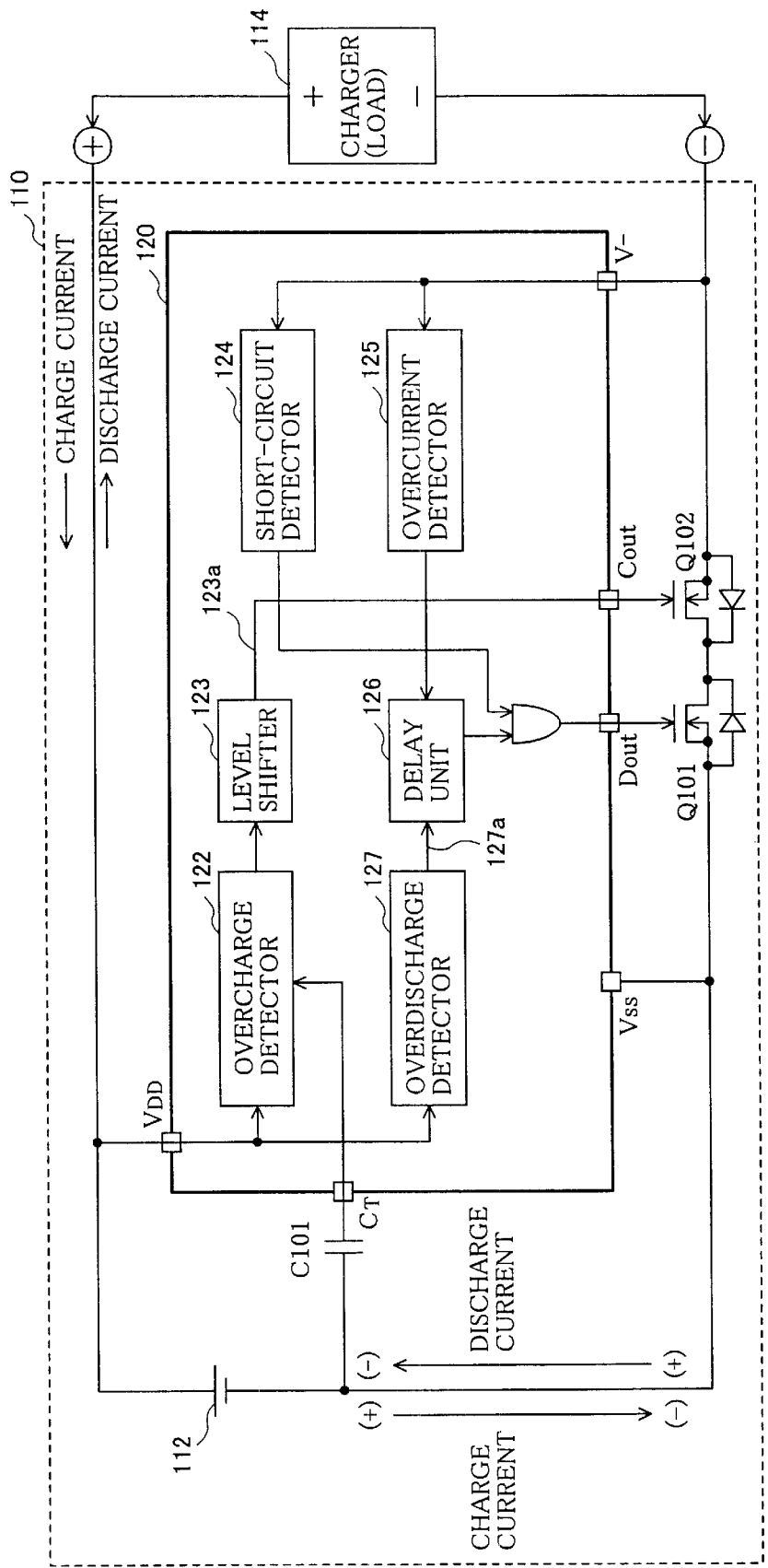
FIG. 3 is a block diagram of a battery pack in which a charge/discharge protection circuit is provided.

FIG. 3 shows a configuration of a battery pack in which a charge/discharge protection circuit is provided.

As shown in FIG. 3, the battery pack 110 generally includes a rechargeable battery 112, a discharge control FET (field-effect transistor) switch Q101, a charge control FET switch Q102, a capacitor C101, and a charge/discharge protection circuit 120. The capacitor C101 is connected between the battery 112 and the charge/discharge protection circuit 120, and the capacitor C101 sets a delay time when an overdischarge condition of the battery 112 is detected.

In the configuration shown in FIG. 3, a charger 114 is connected to the battery pack 110 to put the rechargeable battery 112 on charge. This configuration corresponds to a charging process of the battery 112. However, during a discharging process in which the battery 112 supplies power to mobile electronic equipment, a main part of the mobile electronic equipment may be connected as the load to the battery pack 110 in place of the charger 114.

In the battery pack 110, the charge/discharge protection circuit 120 has six input/output terminals: $V_{DD}$, $V_{SS}$, $C_T$, $D_{OUT}$, $C_{OUT}$, and V–. In the charge/discharge protection circuit 120, the electric potential of the terminal $V_{DD}$ to the terminal $V_{SS}$ is equal to the voltage supplied by the battery 112. The electric potential of the terminal $V_{DD}$ to the terminal V– is equal to the voltage supplied by the charger 114. If an improper charger 114 supplying an excessively high voltage is connected to the battery pack 110, then the potential of the terminal V– is lower than the potential of the terminal $V_{SS}$ as the positive electrode of the battery 112 and the positive electrode of the charger 114 are connected to the terminal $V_{DD}$.

In a case of a commonly used lithium ion battery provided as the battery 112, when the voltage supplied to the battery 112 is detected as being higher than, for example, 4.25 V (or 4.35 V), the charge/discharge protection circuit 120 determines that an overcharge condition of the battery 112 occurs. When the overcharge condition of the battery 112 is detected, the charge/discharge protection circuit 120 turns off the charge control FET switch Q102 so that the connection between the negative electrode of the charger 114 and the negative electrode of the battery 112 is cut off. The charging current from the charger 114 does not flow to the battery 112 because the connection between the charger 114 and the battery 112 is cut off. The charge/discharge protection circuit 120 serves to protect the battery 112 from being steadily subjected to the high voltage supplied by an improper charger 114. The voltage supplied by the charger 114 produces the potential difference between the terminal $V_{DD}$ and the terminal $V_{SS}$, which is equal to, for example, 28 V.

In the battery pack 110, the terminal $V_{SS}$ and the circuit elements of the protection circuit 120 connected to the terminal $V_{SS}$ are never subjected to the high voltage supplied by an improper charger 114. Similarly, the terminal $C_T$ and the circuit elements of the protection circuit 120 connected to the terminal $C_T$ are never subjected to the high voltage supplied by an improper charger 114. When the overcharge condition of the battery 112 occurs, the FET switch Q101 is disconnected from the terminal V– due to the OFF state of the FET switch Q102. The FET switch Q101 and the FET switch Q102 are, respectively, connected to the terminal $D_{OUT}$ and the terminal $C_{OUT}$ of the protection circuit 120. Hence, the terminal $D_{OUT}$ and the circuit elements of the protection circuit 120 connected to the terminal $D_{OUT}$ are never subjected to the high voltage supplied by an improper charger 114.

Suppose that an improper charger 114 supplying an excessively high voltage is connected to the battery pack 110, and the charge control FET switch Q102 is set in the OFF state by the charge/discharge protection circuit 120. The electric potential of the terminal $V_{DD}$ to which the positive electrode of the battery 112 is connected is considered as the reference potential. The terminals $V_{SS}$, $C_T$ and $D_{OUT}$ are subjected to only the voltage supplied by the battery 112, but never subjected to the high voltage supplied by the improper charger 114. However, the terminals $C_{OUT}$ and V– are subjected to the high voltage supplied by the improper charger 114.

As described above, in order to avoid the overcharge condition of the battery 112 in the battery pack 110, it is necessary to set the FET switch Q102 in the OFF state. Specifically, the FET switch Q102 is constituted by an n-channel MOSFET (metal-oxide semiconductor field-effect transistor). To set the FET switch Q102 in the OFF state, it is needed to make the difference between the gate level (the voltage of the terminal $C_{OUT}$) and the source level (the voltage of the terminal V–) zero. The terminal $C_{OUT}$ is usually connected to the output of the CMOS (complementary metal-oxide semiconductor) transistors (e.g., the elements Q109 and Q110 in FIG. 4). In order to make the voltage at the output of the CMOS transistors sufficiently large in magnitude to set the FET switch Q102 in the OFF state, it is necessary to take the voltage of the terminal V– as the source level of the CMOS transistors.

In the battery pack 110, the high-voltage resistant structure is needed only for the circuit elements connected to the terminal $C_{OUT}$ and the terminal V–. The low-voltage resistant structure may be used for the other circuit elements of the battery pack 110. In the configuration of the battery pack 110 of FIG. 3, a short-circuit detector unit 124 and an overcurrent detector unit 125 are connected to the terminal V–. The circuit elements of the short-circuit detector unit 124 and the overcurrent detector unit 125 take the voltage of the terminal V– as the input voltage to a comparator (or the gate voltage). However, these circuit elements do not take the voltage of the terminal V– as the source level of the CMOS transistors as in the transistors Q109 and Q110 in FIG. 4. Hence, the high-voltage resistant structure is not needed for the circuit elements of the short-circuit detector unit 124 and the overcurrent detector unit 125.

Next, a description will be given of the configuration and operation of the charge/discharge protection circuit 120 in the battery pack 110 with reference to FIG. 3 and FIG. 4.

The charge/discharge protection circuit 120 protects the battery 112 from being damaged when an overcharge condition, an overdischarge condition or an overcurrent condition of the battery 112 occurs.

In the charge/discharge protection circuit 120 of FIG. 3, an overcharge detector unit 122, a level shifter unit 123, a short-circuit detector unit 124, an overcurrent detector unit 125, a delay unit 126 and an overdischarge detector unit 127 are provided on the same substrate. The level shifter unit 123 is provided to shift the $V_{SS}$ level to the V– level. The delay unit 126 is provided to set a delay time when the overdischarge condition or the overcurrent condition of the battery 112 is detected.

The operations of the overdischarge detector unit 127, the delay unit 126, the overcurrent detector unit 125 and the short-circuit detector unit 124 are commonly known in the related art, and a description thereof will be omitted. For a detailed description of the operations of these units in the charge/discharge protection circuit, see Japanese Laid-Open Patent Applications No.6-104015 and No.10-004637.

In the charge/discharge protection circuit 120, when the overcharge detector unit 122 detects an overcharge condition of the battery 112, it supplies a low-level detection signal 122a to the level shifter unit 123. When the battery 112 is in a normal charging condition, the overcharge detector unit 122 supplies a high-level ("H") signal 122a to the level shifter unit 123. The level shifter unit 123 supplies a charge control signal 123a to the terminal $C_{OUT}$ based on the detection signal 122a supplied by the overcharge detector unit 122. When the charge control signal 123a is received at the terminal $C_{OUT}$, the charge control FET switch Q102 is turned off, so as to avoid the overcharge condition of the battery 112.

Figure 4:
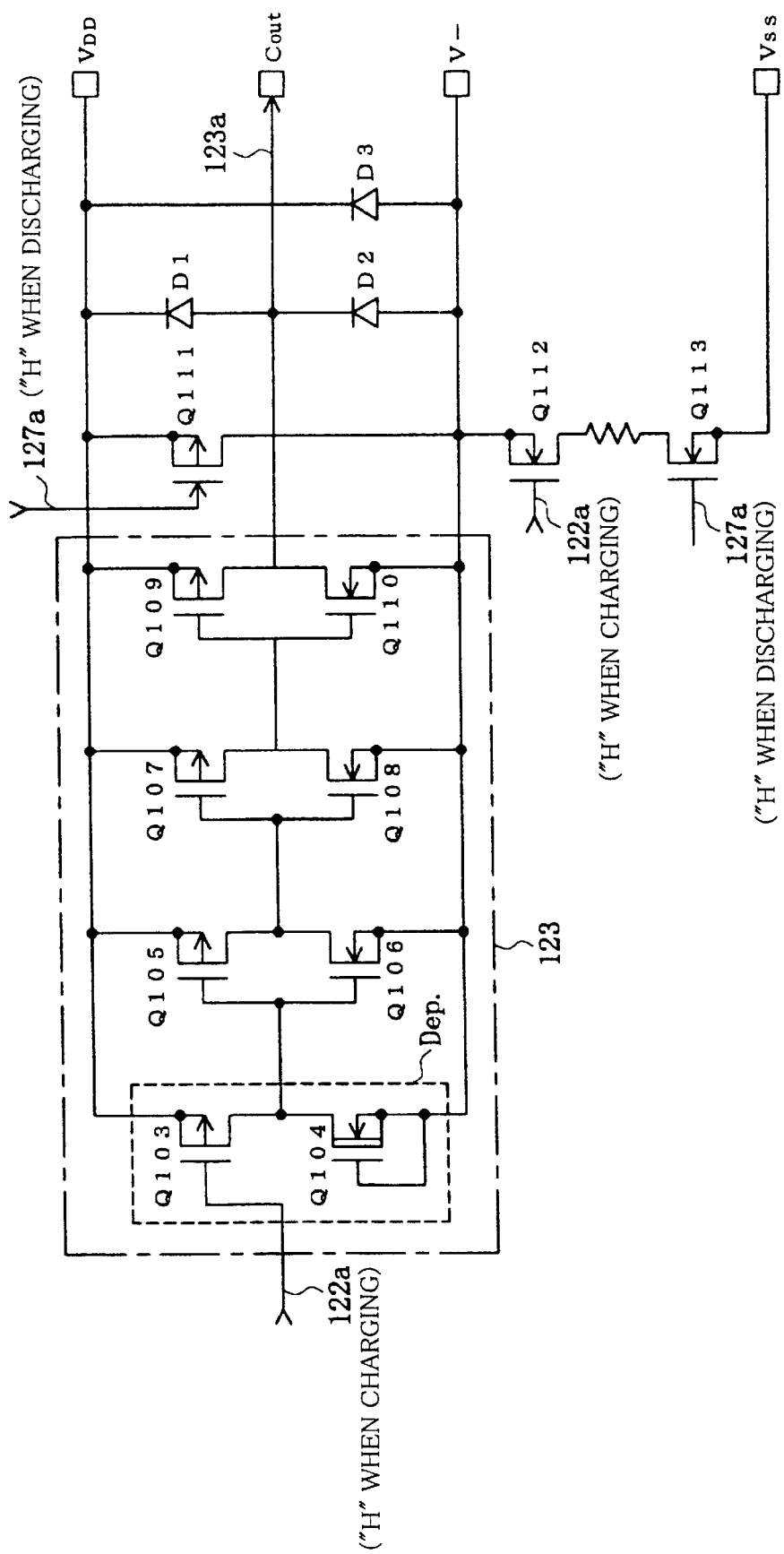
FIG. 4 is a circuit diagram of a main portion of the charge/discharge protection circuit of FIG. 3.

FIG. 4 shows a configuration of a main portion of the charge/discharge protection circuit 120. In particular, a detailed configuration of the level shifter unit 123, which uses the high-voltage resistant structure of the CMOS transistor, is illustrated in FIG. 4.

In the level shifter unit 123 of FIG. 4, an enhancement-type p-channel transistor Q103 and a depletion-type n-channel transistor Q104 are connected in series. The transistor Q103 has a gate connected to the level shifter unit input (to which the signal 122a is supplied), a source connected to the terminal $V_{DD}$, and a drain connected to the transistor Q104. The transistor Q104 has a drain connected to the drain of the transistor Q103, a source connected to the terminal V–, and a gate connected to the source of the transistor Q104 itself. The transistor Q104 acts as a constant current source. At the output of the transistors Q103 and Q104, a given number of inverter circuits (Q105, Q106), (Q107, Q108) and (Q109, Q110) are cascaded, as shown in FIG. 4.

At the output of the level shifter unit 123, a p-channel transistor Q111, an n-channel transistor Q112 and an n-channel transistor Q113 are provided. The transistor Q111 has a source connected to the terminal $V_{DD}$, a drain connected to the terminal V–, and a gate connected to an output of the overdischarge detector unit 127 (to which an overdischarge detection signal 127a is supplied).

When the overdischarge detector unit 127 detects an overdischarge condition of the battery 112, it supplies a low-level overdischarge detection signal 127a. When the battery 112 is in a normal discharged condition, the overdischarge detector unit 127 supplies a high-level ("H") signal 127a. When the low-level overdischarge detection signal 127a is received at the gate of the transistor Q111, the transistor Q111 is turned on so that the electric potential of the terminal V– is pulled up to the electric potential of the terminal $V_{DD}$. Hence, the charge/discharge protection circuit 120 inhibits the supply of the current from the battery 112 in the overdischarge condition to the load, and avoids the unstable circuit condition even if the connection between the terminal VDD and the terminal V– is set in an open condition.

Similarly, the transistor Q112 has a gate connected to an output of the overcharge detector unit 122 (to which the overcharge detection signal 122a is supplied), and the transistor Q113 has a gate connected an output of the overdischarge detector unit 127 (to which the overdischarge detection signal 127a is supplied). The transistor Q112 has a source connected to the terminal V– and a drain connected to the transistor Q113 via a resistor. The transistor Q113 has a source connected to the terminal $V_{SS}$ and a drain connected to the transistor Q113 via the resistor. When the high-level ("H") signal 122a is received at the gate of the transistor Q112, the transistor Q112 is turned on. When the high-level ("H") signal 127a is received at the gate of the transistor Q113, the transistor Q113 is turned on. Namely, when neither the overcharge condition of the battery 112 nor the overdischarge condition of the battery 112 is detected, the transistor Q112 and the transistor Q113 are turned on so that the electric potential of the terminal V– is pulled down to the electric potential of the terminal $V_{SS}$. The transistors Q112 and Q113 serve as a pull-down resistor that pulls down the potential of the terminal V– to the potential of the terminal $V_{SS}$ when the open circuit condition of the battery pack plus and minus terminals occurs after the plus and minus terminals of the battery pack 110 are short circuited.

When the overcharge condition of the battery 112 is detected, the transistor Q112 is turned off to cut off the connection between the terminal V– and the terminal $V_{SS}$, and the transistor Q113 is not subjected to the high voltage supplied by an improper charger 114. The high-voltage resistant structure is not needed for the transistor Q113.

When the high-level ("H") signal 122a, indicating that the battery 112 is in a normal charging condition, is received at the gate of the transistor Q103, the transistor Q103 is turned off, and the transistor Q104 acts as a constant current source. The drain voltage of the transistors Q103 and Q104 is set at the low level (which is equal to the electric potential of the terminal V–). The low-level voltage is supplied to the input of the transistors Q105 and Q106. (which form the inverter circuit). The transistor Q105 is turned on and the transistor Q106 is turned off. The drain voltage of the transistors Q105 and Q106 is set at the high level (which is equal to the electric potential of the terminal $V_{DD}$).

The high-level voltage from the output of the transistors Q105 and Q106 is further supplied to the input of the transistors Q107 and Q108 (which form the inverter circuit). The transistor Q107 is turned off and the transistor Q108 is turned on. The drain voltage of the transistors Q107 and Q108 is set at the low level. The low-level voltage is supplied to the input of the transistors Q109 and Q110 (which form the inverter circuit). The transistor Q109 is turned on and the transistor Q110 is turned off. The drain voltage of the transistors Q109 and Q110 (which is equal to the electric potential of the terminal $C_{OUT}$) is set at the high level. As a result, the charge control FET switch Q102 (shown in FIG. 3), having the gate connected to the terminal $C_{OUT}$, is turned on by the high-level gate voltage, which allows the charging of the battery 112 by the charger 114 to be started. Namely, the charge/discharge protection circuit 120 turns on the charge control FET switch Q102, so that the connection between the negative electrode of the charger 114 and the negative electrode of the battery 112 is established. The charging current from the charger 114 flows to the battery 112.

When the low-level detection signal 122a, indicating that an overcharge condition of the battery 112 occurs, is received at the gate of the transistor Q103, the above-described operation of the level shifter 123 is reversed. As a result, the drain voltage of the transistors Q109 and Q110 (or the potential of the terminal $C_{OUT}$) is set at the low level (which is equal to the potential of the terminal V–). The charge control FET switch Q102 (shown in FIG. 3), having the gate connected to the terminal $C_{OUT}$, is turned off, which inhibits the charging of the battery 112 by the charger 114.

As is apparent from the configuration of FIG. 4, the source voltage or the drain voltage of the above-mentioned transistors Q103 through Q112 is set at the potential of the terminal V–. The high-voltage resistant structure is needed for the transistors Q103 through Q112, and the low-voltage resistant structure may be used for the other circuit elements of the charge/discharge protection circuit 120. In the configuration of FIG. 4, diodes D1, D2 and D3 are provided to protect the charge/discharge protection circuit 120 against electrostatic damage. It is preferred that the high-voltage resistant structure is used for the diodes D1 through D3 as well.

Figure 7:
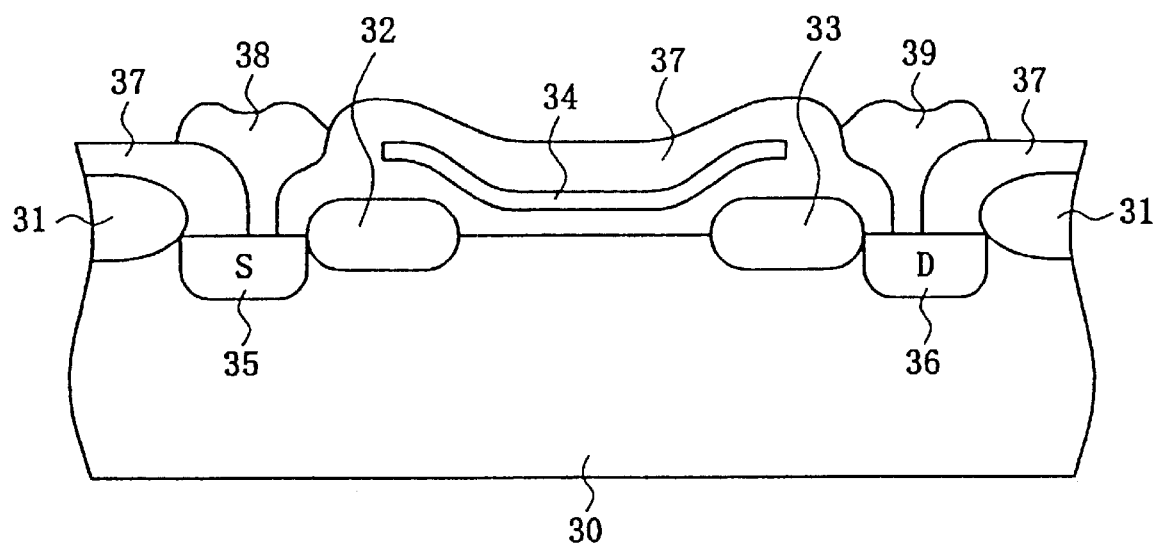
FIG. 7 is a diagram for explaining a high-voltage resistant structure of a metal-oxide semiconductor transistor.

In the charge/discharge protection circuit 120 of FIG. 3, the circuit elements (the transistors Q103 through Q112 in FIG. 4), which are connected to the terminal $C_{OUT}$ and the terminal V–, are constructed in the high-voltage resistant structure as shown in FIG. 7. The high-voltage resistant structure shown in FIG. 7 is of a MOS (metal-oxide semiconductor) transistor, and it is called the bi-directional LOCOS (local oxidation of silicon) offset structure.

As shown in FIG. 7, in the high-voltage resistant structure, an element-isolating oxide layer 31, a first offset oxide layer 32 for increasing a source voltage resistance, and a second offset oxide layer 33 for increasing a drain voltage resistance are formed on a substrate 30. A gate 34 of polysilicon, which is overlapped over the first offset oxide layer 32 and the second offset oxide layer 33, is formed. A source 35 ("S") and a drain 36 ("D") are formed on the substrate 30. An intermediate protective layer 37 containing the gate 34 is formed on the substrate 30, and a source electrode 38 of aluminum connected to the source 35 and a drain electrode 39 of aluminum connected to the drain 36 are further formed.

In a case of a normal LOCOS offset structure, the offset oxide layer is formed only on the drain side of the MOS transistor. However, in the case of the charge/discharge protection circuit 120 of FIG. 3, the offset oxide layer 32 and the offset oxide layer 33 are formed on both the source side and the drain side of the MOS transistor. Such bi-directional structure is needed for the charge/discharge protection circuit 120 because the charger 114 may be erroneously attached to the battery pack 110 in a reversed manner such that the plus terminal and the minus terminal of the charger are reversed to the corresponding terminals of the battery pack 110.

Accordingly, in the charge/discharge protection circuit 120 of FIG. 3, the high-voltage resistant structure (the bi-directional LOCOS offset structure) is needed only for the circuit elements (the transistors Q103 through Q112, and preferably, the diodes D1 through D3), which are connected to the terminal $C_{OUT}$ and the terminal V–. The low-resistant structure may be used for all of the other circuit elements of the charge/discharge protection circuit 120. This makes it possible to provide a small-size, high-voltage-resistant charge/discharge protection circuit for a battery pack.

The charge/discharge protection circuit 120 of FIG. 3 can avoid the damage of the battery when it is placed in the overcharge condition, and it is useful for downsizing the integrated circuit chip for mounting the charge/discharge protection circuit.

However, the input of the short-circuit detector unit 124 and the input of the overcurrent detector unit 125 are connected directly to the terminal V–. When an improper charger 114 is connected to the battery pack 110, a large voltage from the improper charger 114 will be supplied to the charge/discharge protection circuit 120. The charge/discharge protection circuit 120 detects that the overcharge condition of the battery 112 occurs due to the large voltage supplied by the improper charger 114, and turns off the charge control FET switch Q102 to cut off the connection between the improper charger 114 and the battery 112. At this time, the potential of the terminal V– (the minus electrode of the improper charger 114) is lower than the potential of the terminal $V_{SS}$ (the minus electrode of the battery 112). The potential of the plus electrode of the battery 112 is the same as the potential of the plus electrode of the improper charger 114. The voltage (the potential of the terminal V–) at the inputs of the short-circuit detector unit 124 and the overcurrent detector unit 125 in the charge/discharge protection circuit 120 is lower than the potential of the terminal $V_{SS}$ (the minus electrode of the battery 112). If this condition is kept on for a long time (e.g., 24 hours), the threshold voltage of the input transistors in the short-circuit detector unit 124 and the overcurrent detector unit 125 will be significantly varied. As a result, the ON/OFF characteristics of the input transistors in the short-circuit detector unit 124 used for detection of the short-circuit condition will be significantly varied, and the ON/OFF characteristics of the input transistor in the overcurrent detector unit 125 used for detection of the overcurrent condition of the battery 112 will be significantly varied.

Since the charge/discharge protection circuit 120 of FIG. 3 is configured such that some circuit elements are constructed in the high-voltage resistant structure and the others are constructed in the low-voltage resistant structure, the variation of the ON/OFF characteristics of the input transistors in the units 124 and 125 is more considerable than in a charge/discharge protection circuit that is configured with all the circuit elements built in the same structure.

Figure 5:
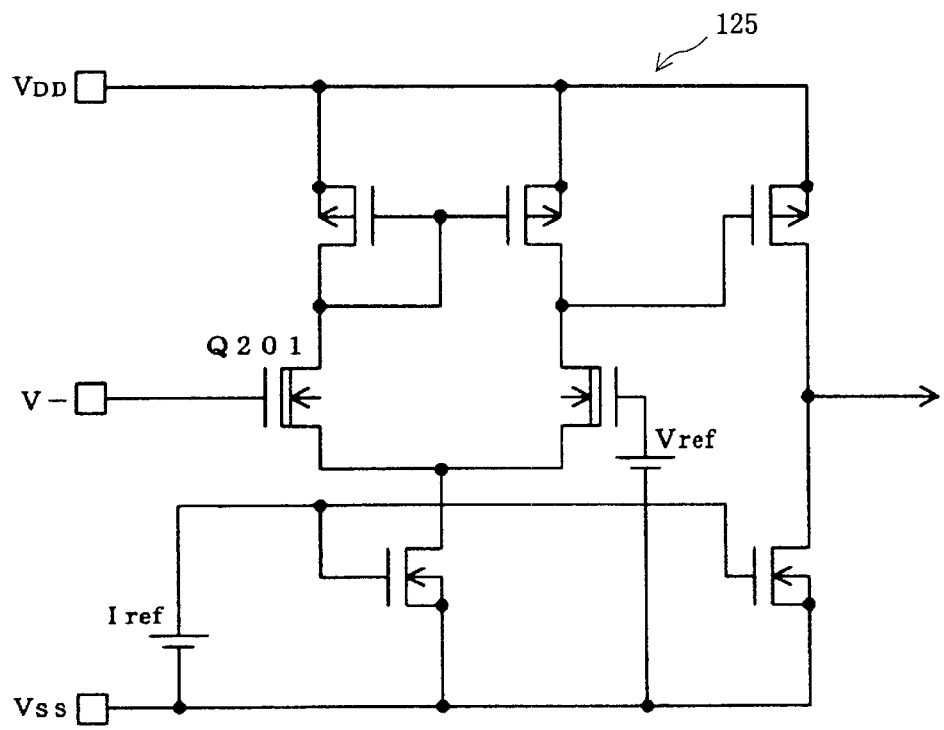
FIG. 5 is a circuit diagram of a comparator in an overcurrent detector unit in the charge/discharge protection circuit of FIG. 3.

With respect to the above problem, FIG. 5 shows a comparator circuit in the overcurrent detector unit 125 in the charge/discharge protection circuit of FIG. 3.

As shown in FIG. 5, the comparator circuit of the overcurrent detector unit 125 includes an input transistor Q201, and the voltage of the terminal V− is supplied to the gate of the input transistor Q201 for comparison of the input voltage with a reference voltage Vref. The input transistor Q201 in the present embodiment is a depletion-type n-channel transistor. Suppose that the battery pack 110 contains a 4-V lithium ion battery as the battery 112 and that an improper charger 114 supplying a large voltage of 28 V is connected to the battery pack 110. In such a case, in the comparator circuit of FIG. 5, the gate of the input transistor Q201 is connected to the terminal V−, and the voltage at the gate of the input transistor Q201 is set at −24 V due to the large voltage supplied by the improper charger 114.

If the above condition of the input transistor Q201 is kept on for a long time, the ON/OFF characteristics of the input transistor Q201 in the overcurrent detector unit 125 will be significantly varied. The offset of the comparator circuit will become large. As a result, the ON/OFF characteristics of the input transistor in the overcurrent detector unit 125 used for detection of the overcurrent condition of the battery 112 will be significantly varied.

Figure 6:
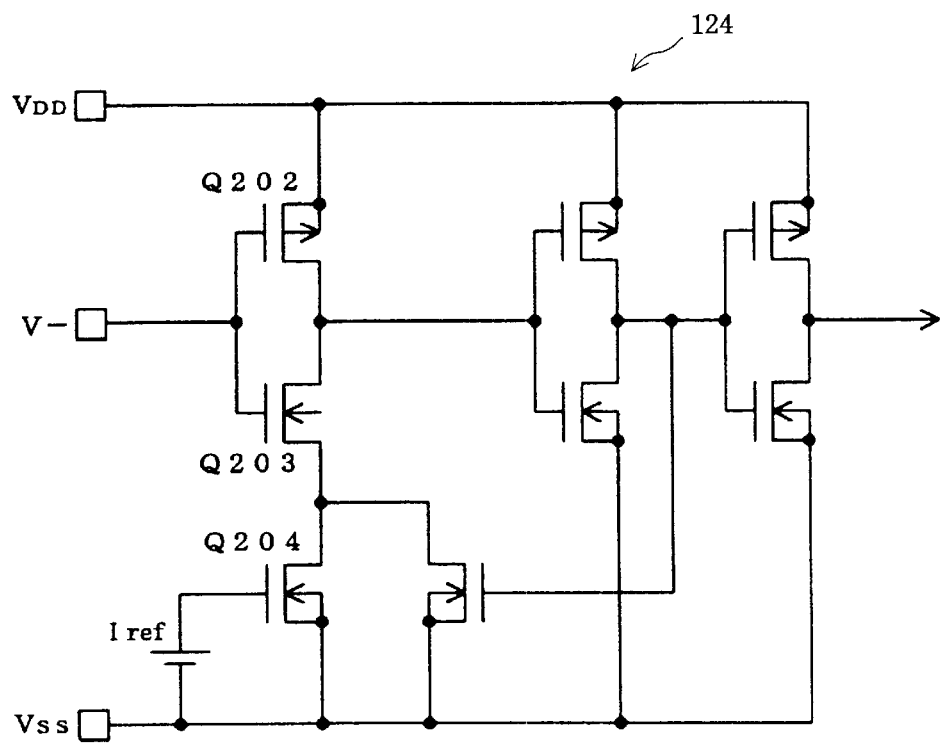
FIG. 6 is a circuit diagram of a short-circuit detector unit in the charge/discharge protection circuit of FIG. 3.

Further, with respect to the above problem, FIG. 6 shows a configuration of the short-circuit detector unit 124 in the charge/discharge protection circuit of FIG. 3.

As shown in FIG. 6, the short-circuit detector unit 124 includes a p-channel input transistor Q202, an n-channel input transistor Q203, and an n-channel transistor Q204. The voltage of the terminal V− is supplied to the gate of the input transistors Q202 and Q203. A reference current Iref is supplied to the gate of the transistor Q204. The p-channel transistor Q202, the n-channel transistor Q203 and the n-channel transistor Q204 form an inverter circuit.

Suppose that the battery pack 110 contains a 4-V lithium ion battery as the battery 112 and that an improper charger 114 supplying a large voltage of 28 V is connected to the battery pack 110. In such a case, in the short-circuit detector unit of FIG. 6, the voltage at the gate of the input transistors Q202 and Q203 is set at −24 V. If this condition is kept on for a long time, the threshold voltage of the input transistors Q202 and Q203 will be varied, and the threshold voltage of the inverter circuit will be significantly varied. As a result, the ON/OFF characteristics of the input transistors Q202 through Q204 in the short-circuit detector unit 124 used for detection of the short-circuit condition will be significantly varied.

In order to overcome the above problems, the charge/discharge protection circuit of the present invention is configured to prevent the variation of the threshold voltage of the circuit elements for detection of the undesired conditions of the battery even when an improper charger is connected to the battery pack over an extended period of time.

Figure 1:
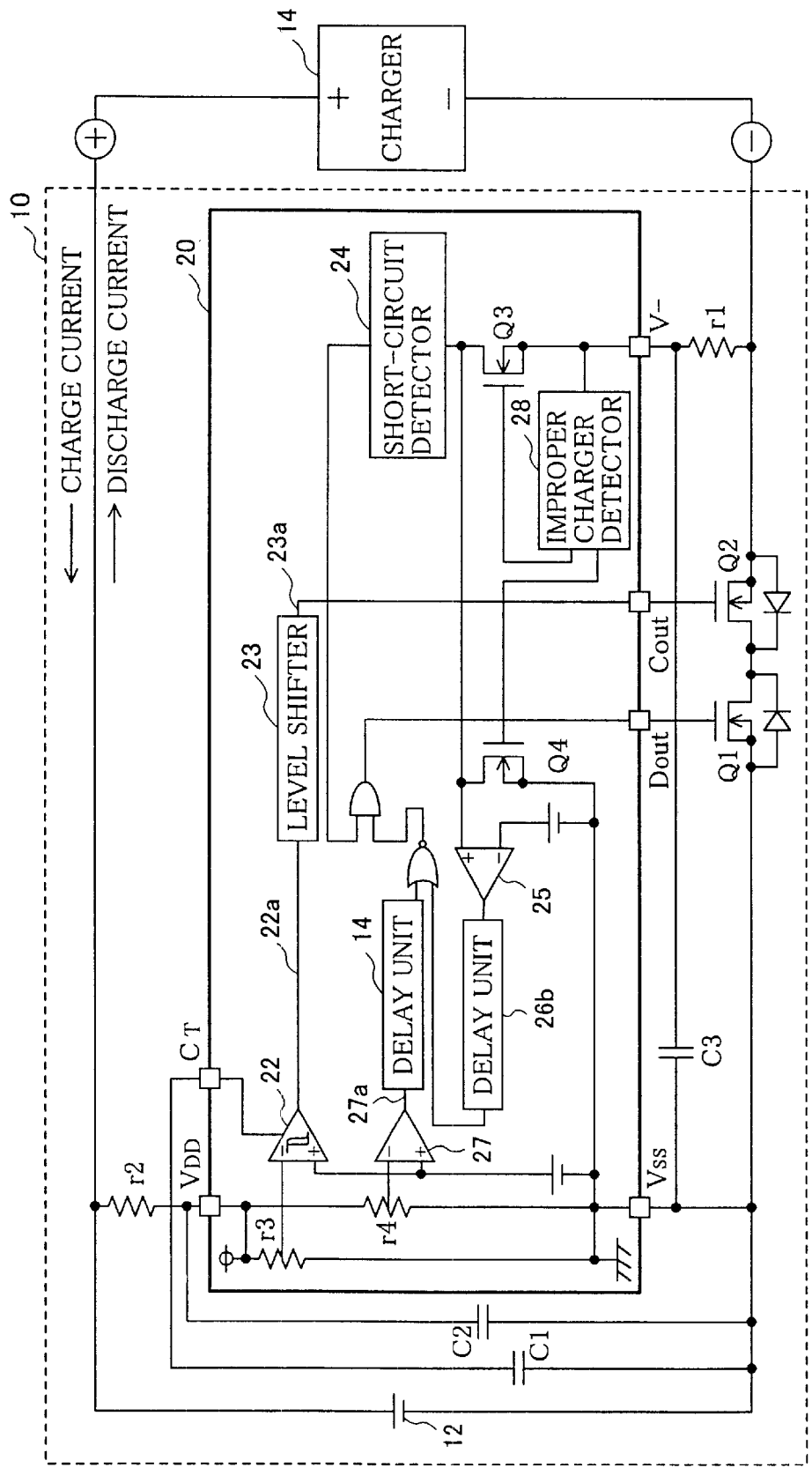
FIG. 1 is a block diagram of a battery pack in which one embodiment of the charge/discharge protection circuit of the present invention is provided.
Figure 2:
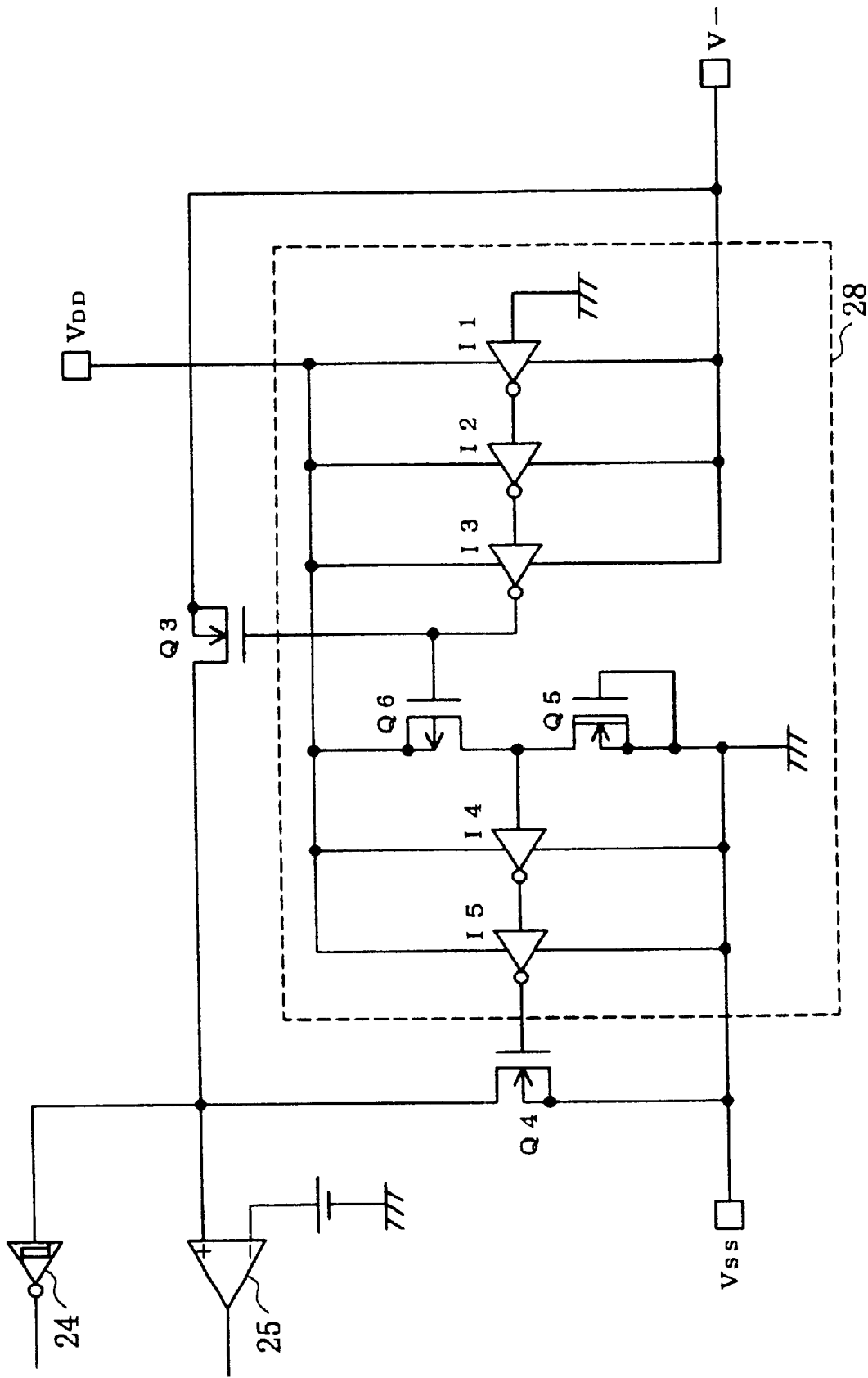
FIG. 2 is a circuit diagram of an improper charger detector unit in the charge/discharge protection circuit of the present embodiment.

A description will now be provided of one preferred embodiment of the charge/discharge protection circuit of the present invention with reference to FIG. 1 and FIG. 2.

FIG. 1 shows a configuration of a battery pack in which one preferred embodiment of the charge/discharge protection circuit of the invention is provided.

As shown in FIG. 1, the battery pack 10 of the present embodiment generally includes a rechargeable battery 12, a discharge control FET switch Q1, a charge control FET switch Q2, a plurality of capacitors C1, C2 and C3, a plurality of resistors r1, r2, r3 and r4, and a charge/discharge protection circuit 20.

In FIG. 1, the battery 12, the discharge control FET switch Q1 and the charge control FET switch Q2 are essentially the same as the corresponding elements 112, Q101 and Q102 in FIG. 3, and a description thereof will be omitted. In order to facilitate understanding of the construction of a practical-use battery pack, the capacitors C1 through C3 and the resistors r1 through r4 are provided in the battery pack 10 shown in FIG. 1. These elements of the battery pack 10 are not relevant to the present invention, and a description thereof will be omitted.

The overall structure, functions and operations of the battery pack 10 of the present embodiment are essentially the same as those of the battery pack 110 described above with reference to FIG. 3 through FIG. 7, and a description thereof will be omitted.

In the configuration shown in FIG. 1, a charger 14 is connected to the battery pack 10 to put the rechargeable battery 12 on charge. This configuration corresponds to a charging process of the battery 12. However, during a discharging process in which the battery 12 supplies power to mobile electronic equipment, a main part of the mobile electronic equipment may be connected as the load to the battery pack 10 in place of the charger 14.

In the battery pack 10 of FIG. 1, the charge/discharge protection circuit 20 has six input/output terminals: $V_{DD}$, $V_{SS}$, $C_T$, $D_{OUT}$, $C_{OUT}$, and V−, which are essentially the same as corresponding elements in FIG. 3. If an improper charger 14 supplying an excessively high voltage is connected to the battery pack 10, then the potential of the terminal V− is lower than the potential of the terminal $V_{SS}$ as the positive electrode of the battery 12 and the positive electrode of the improper charger 14 are connected to the terminal $V_{DD}$ and set at the same potential.

In the battery pack 10 of FIG. 1, the charge/discharge protection circuit 20 includes an overcharge detector unit 22, a level shifter unit 23, a short-circuit detector unit 24, an overcurrent detector unit 25, delay units 26a and 26b, and an overdischarge detector unit 27, which are essentially the same as the corresponding elements 122, 123, 124, 125, 126, and 127 in FIG. 3, respectively. A duplicate description thereof will be omitted. Further, the charge/discharge protection circuit 20 of FIG. 1 produces a detection signal 22a, a charge control signal 23a and a detection signal 27a, which are essentially the same as the corresponding signals 122a, 123a and 127a produced in the charge/discharge protection circuit 120 of FIG. 3. A duplicate description thereof will be omitted.

As shown in FIG. 1, the charge/discharge protection circuit 20 of the present embodiment is characterized by including an improper charger detector unit 28, a first transistor Q3, and a second transistor Q4. The improper charger detector unit 28 detects whether an improper charger 14, supplying an excessively high voltage, is connected to the battery pack 10, in response to a voltage supplied to the terminal V− by the improper charger 14. When the connection of the improper charger 14 to the battery pack 10 is detected, the improper charger detector unit 28 outputs a detection signal to each of the first transistor Q3 and the second transistor Q4.

The first transistor Q3 in the present embodiment is an n-channel transistor which has a source connected to the terminal V−, a gate connected to a first output of the improper charger detector 28, and a drain connected to the input of the short-circuit detector unit 24. The first transistor Q3 is set in OFF state in response to the detection signal output by the improper charger detector unit 28 so that a connection between the terminal V− and the input of the short-circuit detector unit 24 is cut off, and set in ON state when no detection signal is output by the improper charger detector unit 20 so that the connection is established.

The second transistor Q4 in the present embodiment is an n-channel transistor which has a source connected to the terminal $V_{SS}$, a gate connected to a second output of the improper charger detector unit 28, and a drain connected to the input of the overcurrent detector unit 25 (or, a non-inverting input of a comparator circuit). The overcurrent detector unit 25 in the present embodiment is constituted by the comparator circuit as shown in FIG. 5, which has a non-inverting input connected through the first transistor Q3 to the terminal V−, an inverting input connected through a constant voltage source to the terminal $V_{SS}$, and an output connected to the relay unit 26b. The second transistor Q4 is set in ON state in response to the detection signal output by the improper charger detector unit 28 so that both the voltage of the non-inverting input of the overcurrent detector unit 25 and the voltage of the input of the short-circuit detector unit 24 are set at the voltage of the terminal $V_{SS}$, and set in OFF state when no detection signal is output by the improper charger detector unit 28 so that the non-inverting input of the overcurrent detector unit 25 is disconnected from the terminal $V_{SS}$.

Accordingly, the charge/discharge protection circuit 20 of the present embodiment is effective in preventing the threshold voltage of the input transistors in the short-circuit detector unit 24 and the overcurrent detector unit 25 from being significantly varied when the improper charger 14 is connected to the battery pack 10 for a long time. Further, the charge/discharge protection circuit 20 of the present embodiment is effective in avoiding the damage of the battery 12 when it is placed in the overcharge condition, the overdischarge condition or the overcurrent condition, and in downsizing the integrated circuit chip for mounting the charge/discharge protection circuit 20.

FIG. 2 shows a configuration of the improper charger detector unit 28 in the charge/discharge protection circuit of the present embodiment.

As shown in FIG. 2, the improper charger detector unit 28 of the present embodiment includes an n-channel transistor Q5, a p-channel transistor Q6, a plurality of cascade-connection inverters I1, I2 and I3, and a plurality of cascade-connection inverters I4 and I5.

Suppose that the battery pack 10 contains a 4-V lithium ion battery as the battery 12 and that an improper charger 14 supplying a large voltage of 28 V is connected to the battery pack 10. In this condition, in the improper charger detector unit 28 of FIG. 2, the electric potential of the terminal $V_{DD}$ to the terminal $V_{SS}$ is equal to the voltage (4 V) supplied by the battery 12, and the electric potential of the terminal $V_{DD}$ to the terminal V− is equal to the high voltage (28 V) supplied by the improper charger 14. The terminal $V_{SS}$ is grounded. In the inverter I1, the input voltage is set at the ground voltage (or the voltage of the terminal $V_{SS}$), the high-level voltage is set at the voltage of the terminal $V_{DD}$, and the low-level voltage is set at the voltage of the terminal V−.

In the above-mentioned condition, the input voltage of the inverter I1 is equal to 24 V (=28 V−4V), which is indicated by the electric potential of the terminal $V_{SS}$ to the terminal V−. Suppose that a threshold voltage of the inverter I1 is set at $V_{DD}/2$ (=28/2). In this case, the input voltage of the inverter I1 is larger than the threshold voltage (24>28/2), and the inverter I1 outputs a low-level signal to the inverter I2. The inverter I2 outputs a high-level signal to the inverter I3. The inverter I3 outputs a low-level signal to each of the gate of the p-channel transistor Q6 and the gate of the n-channel transistor Q3. The transistor Q6 is set in ON state. The transistor Q3 is set in OFF state. Therefore, in this case, the transistor Q3 is set in OFF state in response to the low-level signal output by the improper charger detector unit 28 so that the connection between the terminal V− and each of the input of the short-circuit detector unit 24 and the input of the overcurrent detector unit 25 is cut off due to the OFF state of at the transistor Q3.

At the same time, in the above-mentioned condition, the inverter I3 outputs the low-level signal to the gate of the p-channel transistor Q6, and the transistor Q6 is set in ON state. At this time, in the inverter I4, the input voltage is set at the voltage of the terminal $V_{DD}$, the high-level voltage is set at the voltage of the terminal $V_{DD}$, and the low-level voltage is set at the voltage of the terminal $V_{SS}$. The inverter I4 outputs a low-level signal to the inverter I5. The inverter I5 outputs a high-level signal to the gate of the n-channel transistor Q4. The transistor Q4 is set in ON state. Therefore, in the above case, the transistor Q4 is set in ON state in response to the high-level signal output by the improper charger detector unit 28 so that both the voltage of the non-inverting input of the overcurrent detector unit 25 and the voltage of the input of the short-circuit detector unit 24 are set at the voltage of the terminal $V_{SS}$.

Accordingly, the charge/discharge protection circuit 20 of the present embodiment is effective in preventing the threshold voltage of the input transistors in the short-circuit detector unit 24 and the overcurrent detector unit 25 from being significantly varied when the improper charger 14 is connected to the battery pack 10 for a long time. Further, the charge/discharge protection circuit 20 of the present embodiment is effective in avoiding the damage of the battery 12 when it is placed in the- overcharge condition, the overdischarge condition or the overcurrent condition, and in downsizing the integrated circuit chip for mounting the charge/discharge protection circuit 20.

In the above-described embodiment, the transistor Q4 is configured to pull down the voltage of each input of the short-circuit detector unit 24 and the overcurrent detector unit 25 to the voltage of the terminal $V_{SS}$ when an improper charger 14 is connected to the battery pack 10. Alternatively, the transistor Q4 may be configured to pull up the voltage of each input of the short-circuit detector unit 24 and the overcurrent detector unit 25 to the voltage of the terminal $V_{DD}$ when an improper charger 14 is connected to the battery pack 10. In such alternative embodiment, it is possible to achieve the effects that are the same as the effects of the above-described embodiment. Namely, when the improper charger 14 is connected to the battery pack 10, the overcharge condition of the battery 12 is detected by the overcharge detector unit 22. When the overcharge condition of the battery 12 is detected, the short-circuit detector unit 24 and the overcurrent detector unit 25 stop operation. Hence, in this condition, even if the voltage of each input of the short-circuit detector unit 24 and the overcurrent detector unit 25 are pulled up to the voltage of the terminal $V_{DD}$ or pulled down to the voltage of the terminal $V_{SS}$, the charge/discharge protection circuit 20 is not affected by the switching action of the transistor Q4.

Further, in the above-described embodiment, the threshold voltage of the inverter I1 in the improper charger detector unit 28 may be altered. In the improper charger detector unit 28 of the above-described embodiment, it is determined that an improper charger is connected to the battery pack 10, when the voltage supplied to the terminal V− by the improper charger is above a sum of the potential difference between the terminals $V_{DD}$ and $V_{SS}$ and the threshold voltage of the inverter I1. By suitably altering the threshold voltage of the inverter I1, it is possible to change the reference voltage of the improper charger detector unit 28 used for detection of the connection of an improper changer.

The present invention is not limited to the above-described embodiment, and variations and modifications may be made without departing from the scope of the present invention.

Further, the present invention is based on Japanese priority application No.11-312713, filed on Nov. 2, 1999, the entire contents of which are hereby incorporated by reference.

What is claimed is:

1. A charge/discharge protection circuit for protecting a rechargeable battery of a battery pack from damage, comprising:
    a first terminal to which a negative electrode of a charger is connected;
    an internal detector unit having an input connected to the first terminal;
    an improper charger detector unit outputting a detection signal when an improper charger is connected to the battery pack and supplies a voltage exceeding a required charging voltage to the first terminal; and
    connection cutoff means for cutting off, when the detection signal is output by the improper charger detector unit, the connection between the internal detector unit input and the first terminal, so that, when the improper charger is connected to the battery pack, a voltage of the input of the internal detector unit is avoided from being lower than a voltage of a second terminal to which a negative electrode of the battery is connected to substantially prevent variation of a threshold voltage of an input transistor in the internal detector unit when the improper charger is connected to the battery pack over an extended period of time.

2. The charge/discharge protection circuit according to claim 1, wherein the internal detector unit includes:
    an overcurrent detector unit detecting whether an overcurrent condition of the battery occurs, the overcurrent detector unit having an input connected to the first terminal; and
    a short-circuit detector unit detecting whether a short-circuit condition in the charge/discharge protection circuit occurs, the short-circuit detector unit having an input connected to the first terminal.

3. The charge/discharge protection circuit according to claim 1, wherein the connection cutoff means includes:
    a first switch which is set in OFF state in response to the detection signal output by the improper charger detector unit so that the connection is cut off, and set in ON state when no detection signal is output by the improper charger detector unit so that the connection is established; and
    a second switch which is set in ON state in response to the detection signal output by the improper charger detector unit so that the voltage of the input of the internal detector unit is set at the voltage of the second terminal, and set in OFF state when no detection signal is output by the improper charger detector unit so that the input of the internal detector unit is disconnected from the second terminal.

4. The charge/discharge protection circuit according to claim 1, wherein the charge/discharge protection circuit includes circuit elements which are connected directly to the first terminal and constructed in a high-voltage resistant structure, and circuit elements which are not connected directly to the first terminal and constructed in a high-voltage resistant structure.

5. The charge/discharge protection circuit according to claim 4, wherein the high-voltage resistant structure is a bi-directional local oxidation of silicon offset structure of a metal-oxide semiconductor transistor in which an element-isolating oxide layer, a first offset oxide layer for increasing a source voltage resistance, a second offset oxide layer for increasing a drain voltage resistance are formed on a substrate, and a gate of polysilicon, which is overlapped over the first offset oxide layer and the second offset oxide layer, are provided.

6. A battery pack including a rechargeable battery and a charge/discharge protection circuit for protecting the battery from damage, the charge/discharge protection circuit comprising:
    a first terminal to which a negative electrode of a charger is connected;
    an internal detector unit having an input connected to the first terminal;
    an improper charger detector unit outputting a detection signal when an improper charger is connected to the battery pack and supplies a voltage exceeding a required charging voltage to the first terminal; and
    connection cutoff means for cutting off, when the detection signal is output by the improper charger detector unit, the connection between the internal detector unit input and the first terminal, so that, when the improper charger is connected to the battery pack, a voltage of the input of the internal detector unit is avoided from being lower than a voltage of a second terminal to which a negative electrode of the battery is connected to substantially prevent variation of a threshold voltage of an input transistor in the internal detector unit when the improper charger is connected to the battery pack over an extended period of time.

7. The battery pack according to claim 6, wherein the internal detector unit of the charge/discharge protection circuit includes:
    an overcurrent detector unit detecting whether an overcurrent condition of the battery occurs, the overcurrent detector unit having an input connected to the first terminal; and
    a short-circuit detector unit detecting whether a short-circuit condition in the charge/discharge protection circuit occurs, the short-circuit detector unit having an input connected to the first terminal.

8. The battery pack according to claim 6, wherein the connection cutoff means of the charge/discharge protection circuit includes:

a first switch which is set in OFF state in response to the detection signal output by the improper charger detector unit so that the connection is cut off, and set in ON state when no detection signal is output by the improper charger detector unit so that the connection is established; and a second switch which is set in ON state in response to the detection signal output by the improper charger detector unit so that the voltage of the input of the internal detector unit is set at the voltage of the second terminal, and set in OFF state when no detection signal is output by the improper charger detector unit so that the input of the internal detector unit is disconnected from the second terminal.

9. The battery pack according to claim 6, wherein the charge/discharge protection circuit includes circuit elements which are connected directly to the first terminal and constructed in a high-voltage resistant structure, and circuit elements which are not connected directly to the first terminal and constructed in a low-voltage resistant structure.

10. The battery pack according to claim 9, wherein the high-voltage resistant structure is a bi-directional local oxidation of silicon offset structure of a metal-oxide semiconductor transistor in which an element-isolating oxide layer, a first offset oxide layer for increasing a source voltage resistance, a second offset oxide layer for increasing a drain voltage resistance are formed on a substrate, and a gate of polysilicon, which is overlapped over the first offset oxide layer and the second offset oxide layer, are provided.

* * * * *